Patented Nov. 10, 1925.

1,561,219

UNITED STATES PATENT OFFICE.

TENNEY L. DAVIS, OF SOMERVILLE, MASSACHUSETTS.

COATING FOR NITROCELLULOSE POWDER GRAINS.

No Drawing.   Application filed April 28, 1922. Serial No. 557,172.

(GRANTED UNDER THE ACT OF MARCH 3, 1883; 22 STAT. L. 625.)

*To all whom it may concern:*

Be it known that I, TENNEY L. DAVIS, a citizen of the United States, and a resident of Somerville, county of Middlesex and State of Massachusetts, have invented an Improvement in Coatings for Nitrocellulose Powder Grains, of which the following is a specification.

The invention described herein may be used by the Government, or any of its officers or employees in prosecution of work for the Government, or by any other person in the United States, without payment to me of any royalty thereon.

The subject of this invention is a coating for nitrocellulose powder grains.

The main objects of this invention are the provision of a coating for nitrocellulose powder grains capable of being prepared easily from cheap materials; that is impervious to moisture, that renders the grain slower burning.

Specifically, my invention consists in the use of symmetrically substituted dialkyl ureas either with or without other substituent groups. By this is meant that two at least of the hydrogen atoms of urea, (two symmetrically disposed with reference to one another) shall be substituted by alkyl groups, that is, aliphatic radicles.

In the art as practiced at present, the urea derivatives which are widely used are sym-dimethyldiphenylurea, known as "centralite," and sym-diethyldiphenylurea, prepared technically by the interaction of phosgene respectively, with monomethylaniline and with monoethylaniline. Since the urea derivatives now in use contain aromatic groups it is thought that the use of urea derivative contain the two symmetrically disposed aliphatic groups, either with or without other groups, constitutes a definite and considerable change of practice. It is claimed also that these aliphatic ureas are an improvement since they are readily melted and easily soluble, being more readily soluble in the usual solvents, and easily prepared from materials which are cheaper and more abundant.

Colloiding agents for nitrocellulose are used in the celluloid industry as tougheners and as a substitute for camphor. In the explosive industry they are used in the manufacture of colloiding smokeless powders either incorporated throughout the mass of the grain, where they function by toughening the grain and reducing the rapidity and temperature of its combustion (they may also function as stabilizers), or applied to the surface of the grain as a coating where they produce a skin less pervious to moisture than the surface of ordinary powder and of slower rate of burning than the interior of the powder grain.

I have experimented with a large number of urea derivatives and find that aromatic substituted ureas are not good solvents for nitrocellulose unless the total number of aromatic groups is at least three. From this observation it may be inferred that the sym-dimethyldiphenylurea and sym-diethyldiphenylurea which are so widely used do not owe their solvent property in any great measure to the two aromatic groups which they contain. Moreover tri-substituted aromatic ureas are generally high melting substances of limited solubility in most organic solvents.

I find that sym-dimethylurea and sym-diethylurea are slightly better solvents for nitrocellulose weight for weight than similar substances containing two phenyl groups in the molecule. The solvent action of symmetrically substituted dialkylureas remains even if other groups, aliphatic or aromatic, are substituted in the molecule. With an increase in the size of the alkyl groups the solvent action of the substance is improved.

I claim:

1. A nitrocellulose powder grain, and a coating on said powder grain containing, as one of its elements, urea containing only two alkyl groups symmetrically substituted in the molecule.

2. A nitrocellulose powder grain, and a coating on said powder grain comprising urea containing only two alkyl groups symmetrically substituted in the molecule.

3. A nitrocellulose powder grain containing as one of its elements urea containing only two alkyl groups symmetrically substituted in the molecule.

4. A powder grain comprising nitrocellulose and urea containing only two alkyl groups symmetrically substituted in the molecule,

TENNEY L. DAVIS.